United States Patent [19]

Beaver et al.

[11] Patent Number: 4,580,029

[45] Date of Patent: Apr. 1, 1986

[54] PLASMA ARC POWER SUPPLY AND METHOD

[75] Inventors: William W. Beaver; Robert C. Fernicola, both of Florence, S.C.

[73] Assignee: Union Carbide Corporation, Danbury, Conn.

[21] Appl. No.: 545,925

[22] Filed: Oct. 27, 1983

[51] Int. Cl.[4] ............................................. B23K 9/00
[52] U.S. Cl. ........................... 219/121 PT; 219/130.1; 219/137 PS; 219/121 PY
[58] Field of Search ............... 219/121 PT, 121 PW, 219/130.1, 130.4, 137 PS, 130.51, 130.31, 137.71, 76.11, 76.13, 130.33, 130.32, 97, 108, 10.77, 76.14

[56] References Cited

U.S. PATENT DOCUMENTS

| | | | |
|---|---|---|---|
| 3,316,381 | 4/1967 | Gibson | 219/76.14 |
| 3,586,817 | 6/1971 | Manz | 219/130.4 |
| 3,594,541 | 7/1971 | Gorman et al. | 219/130.4 X |

FOREIGN PATENT DOCUMENTS 967710  10/1982  U.S.S.R. .

Primary Examiner—C. L. Albritton
Assistant Examiner—M. M. Lateef
Attorney, Agent, or Firm—Eugene Lieberstein

[57] ABSTRACT

A plasma arc system for plasma arc welding and cutting including a plasma arc torch in circuit with a constant current power supply comprising a transformer having a primary winding and at least one secondary winding with the primary winding connected to a source of alternating current and a bridge rectifier circuit connected across the secondary winding to provide a DC current output. A bank of capacitors is connected across the secondary winding of the transformer with its capacitive reactance matched to the inductive reactance of the transformer to establish a condition of resonance.

5 Claims, 5 Drawing Figures

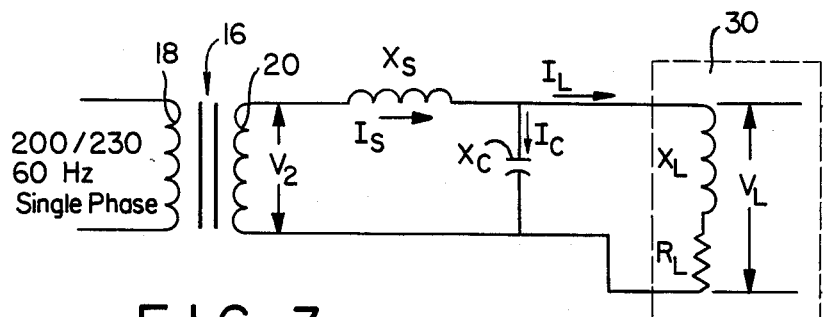
FIG. 3
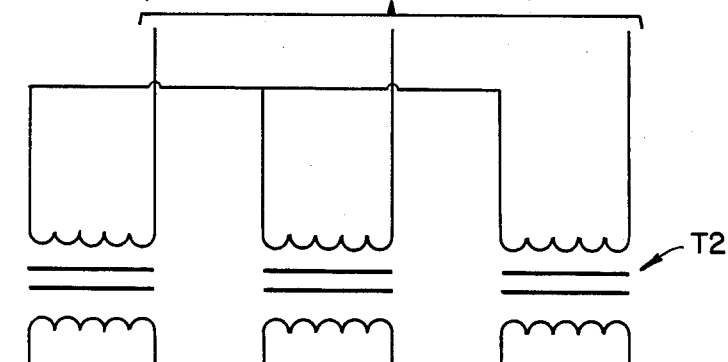
FIG. 5
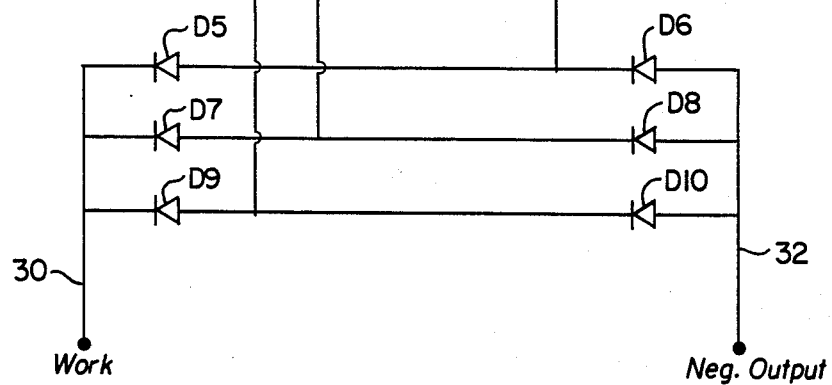

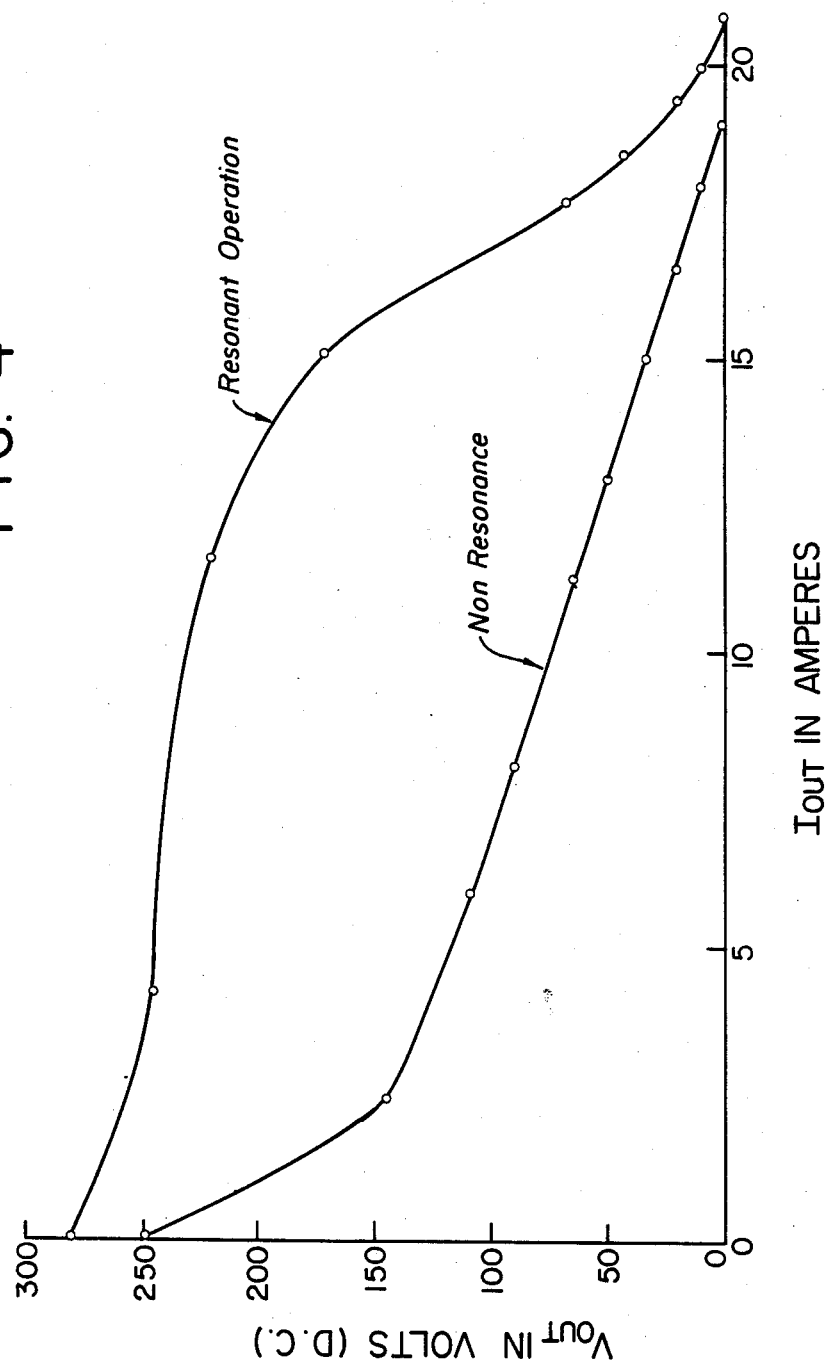

4,580,029

PLASMA ARC POWER SUPPLY AND METHOD

FIELD OF THE INVENTION

This invention relates to a constant current power supply for plasma arc welding and cutting preferably at low current levels and to a method for sustaining a plasma arc at relatively constant low current levels.

BACKGROUND OF THE INVENTION

A plasma arc is a gas ionized arc formed between a nonconsumable electrode and a workpiece which is constricted through the discharge outlet of a nozzle in confluence with a stream of gas preferably in the form of a gas vortex. A plasma arc system includes the plasma arc torch and power supply in combination. The volt ampere characteristic of the plasma arc power supply will determine the degree to which current can be held constant through the arc with varying arc length. At a relatively low current output of below 60 amperes and particularly below about 30 amperes it has been difficult to sustain a constant current arc with a torch standoff above 1/16 inch using nitrogen or air as the plasma gas. Torch standoff represents the distance separating the end of the torch and the workpiece. In a conventional plasma arc system, it is difficult to sustain the plasma arc at such low current levels. Moreover at low operating current levels the cutting performance is sensitive to a change in torch standoff. Accordingly, it has been the practice heretofore to operate a plasma arc system for cutting at constant current levels of above 50 amperes.

SUMMARY OF THE INVENTION

It has been discovered in accordance with the present invention that a plasma arc can be sustained at constant low current levels of substantially below 50 amperes by introducing a capacitive reactance into the power supply on the secondary side of the power supply input transformer and selecting the capacitive reactance to be substantially equal to the inductive reactance of the power supply so as to establish a condition of resonance. The power supply of the present invention permits constant current operation over a wide operating current range particularly at low current levels with a torch stand off of up to about one inch using any conventional plasma torch and without any loss in cutting performance. The open circuit voltage need only be slightly higher than the highest desired operating voltage.

The plasma arc power supply of the present invention comprises an input transformer having a primary winding coupled to a source of alternating potential and at least one secondary winding, capacitive means connected across a secondary winding for substantially establishing a condition of series resonance with the inductive reactance at the secondary of said input transformer and means for converting the resonant output at the secondary of said transformer into a DC output adapted to be coupled in circuit with the electrode of a plasma arc torch and the workpiece.

The principal object of the present invention is to provide a power supply for plasma arc welding and cutting at constant relatively low current levels.

It is a further object of the present invention to provide a method for sustaining a plasma arc at low current levels.

DESCRIPTION OF DRAWINGS

Other objects and advantages of the present invention will become apparent from the following detailed description of the invention when read in conjunction with the accompanying drawings of which:

FIG. 3 is a schematic diagram of the power supply of FIG. 2 for AC resonant operation;

FIG. 4 shows two working volt-ampere characteristic curves for the power supply of FIG. 2 with one of the curves representing a condition of resonance and the other a condition of nonresonance; and FIG. 5 is a modified schematic diagram of the power supply of FIG. 2 for a three phase power line supply.

Figure 1:
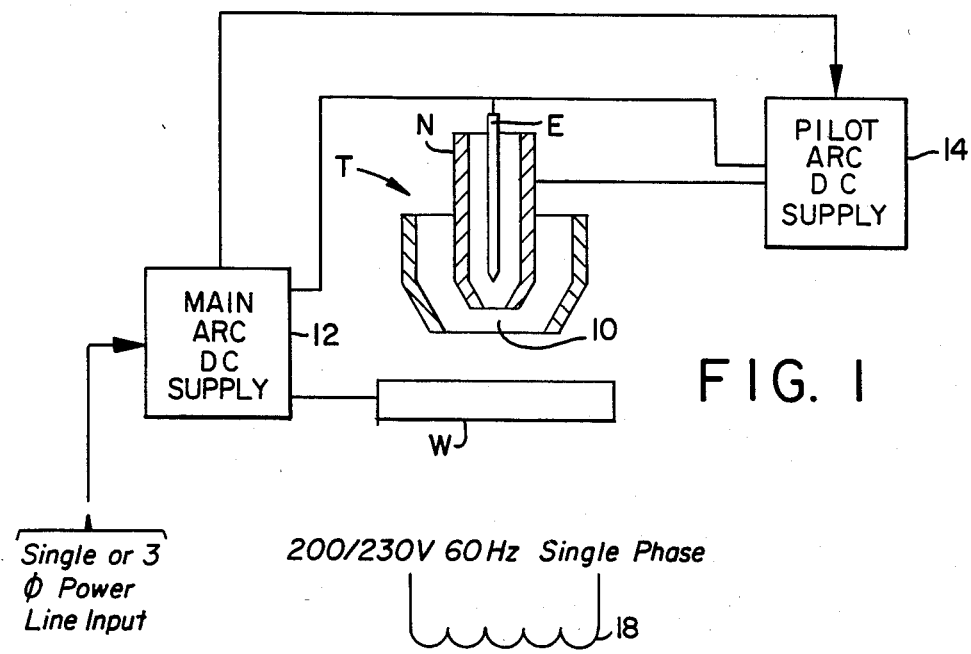
FIG. 1 is a block diagram of the plasma arc power supply of the present invention in combination with a plasma arc torch.

The block diagram of the power supply of the present invention is illustrated in FIG. 1 in combination with a plasma arc torch T including a nonconsumable electrode E, usually of tungsten, coaxially disposed within a nozzle N having an arc constricting discharge outlet 10 arranged below the tip of the electrode E. Gas is passed from a source (not shown) down through the torch T between the electrode E and nozzle N and exits through the discharge outlet 10.

The power supply of the present invention comprises a main arc DC supply 12 and a pilot arc supply 14. The main arc DC supply 12 is connected across the electrode E to workpiece W whereas the pilot arc DC supply 14 is connected across the electrode E and nozzle N. The pilot arc DC supply 14 is of conventional design including a high frequency generator which is used to establish a high frequency discharge path between the electrode E and nozzle N before initiating the pilot arc. The pilot arc DC supply 14 generates a relatively low current pilot arc between the electrode E and nozzle N in the order of 20–30 amperes following the application of high frequency as is well known in the art. The main plasma arc is then generated between the electrode E and workpiece W by transferring the pilot arc to the workpiece as is well known in the art.

Figure 2:
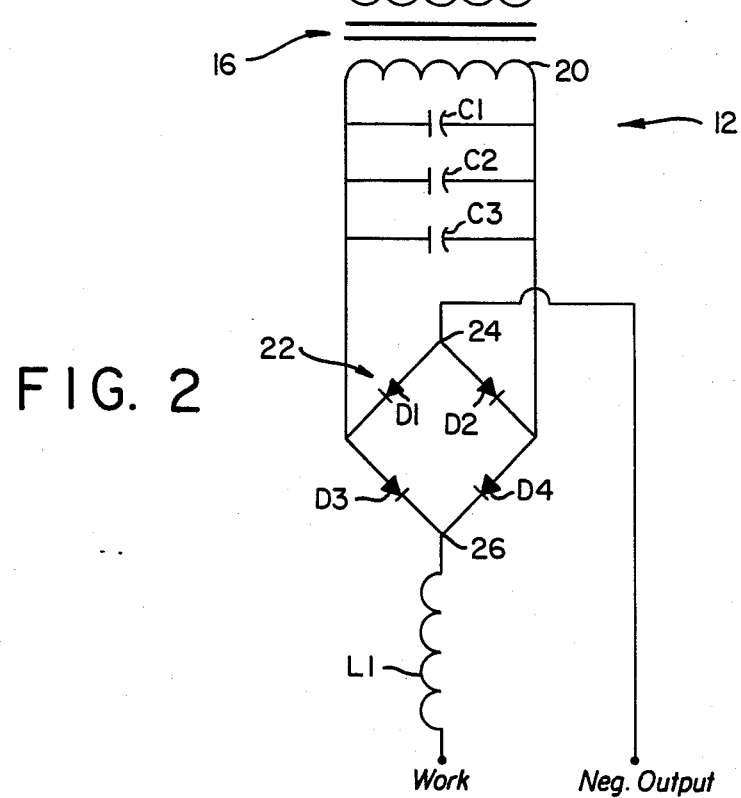
FIG. 2 is a schematic circuit diagram of the power supply of FIG. 1 for a single phase power line supply.

Power is supplied to the main arc DC supply 12 and in turn to the pilot arc DC supply 14 from a single or three phase power line input. The schematic diagram for the main arc DC supply 12 for a single phase 220–230 volt line supply at 50 or 60 Hz is shown in FIG. 2. FIG. 5 is a modified schematic diagram for a three phase line supply.

The main arc DC supply 12 comprises an input transformer 16, preferably a ferroresonant transformer, having a primary winding 18 and a secondary winding 20 with the primary winding 18 coupled to the single phase line supply. A bank of capacitors C1, C2 an C3 are coupled directly across the secondary winding 20. If more than one secondary winding is used, the bank of capacitors should be coupled across of the secondary winding from which the arc current is to be drawn. The bank of capacitors C1, C2 and C3 have a capacitive reactance which is closely matched to the inductive reactance at the secondary side 20 of the transformer 16 to establish a condition of resonance as will be explained in more detail in connection with FIG. 3

A full wave bridge rectifier 22 consisting of diodes D1, D2, D3 and D4 is connected in parallel with the bank of capacitors C1, C2 and C3 and the secondary winding 20 to provide a full wave DC output at the junction points 24 and 26. A filter inductor L1 which is of relatively substantial magnitude is interposed between the junction point 26 and the workpiece while the junction point 24 is connected to the electrode E. Although the full wave bridge rectifier 22 is shown as a diode rectifier it should be understood that silicon controlled rectifiers may be used in place of the diodes particularly if their phase angle is to be controlled for regulating the level of the plasma arc current flow.

FIG. 3 is a schematic circuit equivalent to the circuit of FIG. 2 for resonant operation. $V_2$ represents the open circuit voltage across the secondary winding 20. Xs is the total inductive reactance on the secondary side of the input transformer 16 and includes both the inductance of the secondary winding 20 and any reflective reactance from the primary winding 18. Xc represents the combined capacitive reactance of capacitors C1, C2 and C3 and stray capacitance. $X_L$ is the load inductance including the inductance of the filter inductor $L_1$ whereas $R_1$ represents the load resistance. The circuit of FIG. 3 is an idealized equivalent circuit of the power supply which at resonance results in a load current $I_L$, i.e., the plasma arc current, which is independent of the load impedance and resistance.

The above conclusion is supported by the following equations.

$$I_s = I_L + I_c$$

$$V_L = I_L Z_L$$

$V_L$ is the voltage across the load 30, $Z_L$ is the load impedance, Ic is the current through the capacitive reactance Xc and Is is the current through the secondary winding.

Since $V_L$ is also imposed across the capacitive reactance Xc, then $$V_L = I_c X_c / j = -j I_c X_c$$

and $$I_c = j I_L Z_L / X_c$$

The voltage across the secondary winding $V_2$ equals:

$$V_2 = V_L + jX_s I_s.$$

or upon transforming $$V_2 = I_L Z_L + jX_s \left( I_L + \frac{jI_L Z_L}{X_c} \right)$$

which reduces to $$V_2 = I_L \left( \frac{Z_L X_c + jX_s X_c - Z_L X_s}{X_c} \right)$$

which further reduces to $$V_2 = I_L \left( \frac{Z_L(X_c - X_s)}{X_c} + jX_s \right)$$

When the circuit is operating in a resonant mode Xc=Xs; thus $$V_2 = I_L jX_s$$

and $$I_L = V_2 / jX_s = |V_2| / |X_s|$$

Accordingly, for the idealized case the load current will remain at a fixed constant level independent of variations in load impedance, i.e., independent of torch standoff.

Although as a practical matter, the inductive reactance Xs on the secondary side of the transformer 16 cannot readily be measured, it can be readily calculated by dividing the voltage across the inductive reactance Vxs, which is approximated by measuring the voltage across the capacitive bank, C1, C2 and C3, with the current through the secondary winding $I_s$ as follows:

$$X_s = V_{xs} / I_s$$

At resonance Xs=Xc from which the capacitance C1, C2 and C3 may be readily determined.

A volt-ampere characteristic curve of the power supply of FIG. 2 for both resonant and nonresonant operation is shown in FIG. 4. The nonresonant condition is established by removal of the capacitive bank C1, C2 and C3 from the secondary of the transformer. In the latter case, the volt ampere curve becomes a typical characteristic curve of the prior art. Note that for an operating current of e.g., 15 amperes the output current is relatively constant in response to a relatively large swing in output voltage in comparison to the typical operation without resonance at the same current level.

FIG. 5 illustrates a "wye" connected three phase power supply with resonance established by an appropriate selection of capacitors C4, C5 and C6 across the secondary legs of the transformer T2. The capacitors C4, C5 and C6 may each represent a bank of capacitors having a capacitive reactance which would be determined for each phase in the same manner as calculated for the single phase resonant operation. It should be understood that the capacitors C4, C5 and C6 are unrelated to the conventionally used phase adjusting capacitors and resistors (not shown) which are impressed across the primary legs of the transformer T2. The output across the secondary windings of the transformer T2 is connected to a full wave bridge rectifier comprising diodes D5, D6, D7, D8, D9 and D10 respectively to provide a full ware DC output across output leads 30 and 32. The output leads 30 and 32 are adapted to be connected to the electrode and work of a plasma arc torch.

What is claimed is:

1. In a plasma arc system for welding and/or cutting including a plasma arc torch in circuit with a constant current power supply comprising a transformer having a primary winding and at least one secondary winding with the primary winding adapted to be connected to a source of alternating current, capacitive means coupled across said secondary winding with said capacitive means having a capacitive reactance substantially equal to the inducative reactance of the power supply across said secondary winding so as to establish a resonant circuit between said capacitive means and said inductive reactance and means for converting the output of said resonant circuit to a DC output whereby said power supply will have a constant current characteristic over a predetermined arc working voltage range.

2. In a plasma arc system as defined in claim 1 wherein said converting means comprising a full wave bridge rectifier.

3. In a plasma arc system as defined in claim 2 wherein said primary winding is adapted to be connected to a single phase source of line voltage.

4. In a plasma arc system as defined in claim 2 wherein said transformer has multiple primary and secondary windings arranged in a conventional "wye" configuration with the primary adapted for connection to a three phase source of line voltage and with said capacitive means being coupled across each secondary winding respectively and having a capacitive reactance substantially equal to the inducative reactance across the secondary winding to which it is respectively connected.

5. A method for sustaining a low current plasma arc between a nonconsumable electrode and a workpiece through the discharge outlet of a constricted nozzle in confluence with a stream of gas surrounding the arc, in which the arc current is drawn from a power supply connected in circuit between the nonconsumable electrode and the workpiece with the power supply including a transformer having a primary and secondary winding and a full wave bridge rectifier, comprising the steps of; connecting at least one capacitor across the secondary winding of said transformer on the AC side of said full wave bridge in parallel with the electrode and workpiece and selecting the capacitive reactance of said capacitor to be substantially equal to the inductive reactance of said power supply as measured from the secondary of said transformer so as to form a resonant circuit operating at a condition of resonance.

* * * * *